US012202170B2

(12) United States Patent
Smith, Jr. et al.

(10) Patent No.: US 12,202,170 B2
(45) Date of Patent: Jan. 21, 2025

(54) CONCRETE STRUCTURE FORMING SYSTEM

(71) Applicant: Conewago Manufacturing, LLC, Hanover, PA (US)

(72) Inventors: Don Smith, Jr., New Oxford, PA (US); Erich Kaintz, Hanover, PA (US); Louie Smith, Hanover, PA (US)

(73) Assignee: Conewago Manufacturing LLC, Hanover, PA (US)

( * ) Notice: Subject to any disclaimer, the term of this patent is extended or adjusted under 35 U.S.C. 154(b) by 226 days.

(21) Appl. No.: 17/841,799

(22) Filed: Jun. 16, 2022

(65) Prior Publication Data

US 2023/0405869 A1 Dec. 21, 2023

(51) Int. Cl.

| | |
|---|---|
| ***E04G 15/06*** | (2006.01) |
| ***B28B 7/16*** | (2006.01) |
| ***E04G 11/36*** | (2006.01) |

(52) U.S. Cl.

CPC .............. *B28B 7/164* (2013.01); *E04G 11/36* (2013.01); *E04G 15/06* (2013.01)

(58) Field of Classification Search

CPC ....... B28B 7/0064; B28B 7/0097; B28B 7/24; B28B 7/241; B28B 7/243; B28B 7/362; B28B 7/364; B28B 7/366; B28B 7/384; B28B 7/388; B28B 7/16; B28B 7/162; B28B 7/164; E04G 11/36; E04G 15/06; E04G 15/061; E04G 15/063; E04G 15/04; E04G 21/125; E04G 21/126

See application file for complete search history.

(56) References Cited

U.S. PATENT DOCUMENTS

| | | | | |
|---|---|---|---|---|
| 3,968,191 | A | 7/1976 | Stegmeier | |
| 4,495,744 | A | 1/1985 | Heinz | |
| 4,823,527 | A * | 4/1989 | Harbeke | E03C 1/20 52/220.8 |
| 6,061,990 | A * | 5/2000 | McMahon | E04G 15/061 52/220.8 |
| 6,550,834 | B2 * | 4/2003 | Fromelius | E04G 21/142 52/707 |
| 8,827,235 | B1 * | 9/2014 | Fisher, III | E04G 11/08 249/35 |
| 2003/0029112 | A1 * | 2/2003 | Wise | E04G 9/083 52/439 |
| 2004/0111992 | A1 * | 6/2004 | Bennett | E01C 11/14 52/380 |
| 2004/0182987 | A1 * | 9/2004 | Bennett | E01C 11/14 249/2 |
| 2008/0035830 | A1 | 2/2008 | O'Grady et al. | |

(Continued)

FOREIGN PATENT DOCUMENTS

| | | | |
|---|---|---|---|
| EP | 0884427 | B1 | 4/2002 |
| EP | 3757315 | A1 | 12/2020 |
| KR | 20020047433 | A | 6/2002 |

*Primary Examiner* — Kyle J. Walraed-Sullivan
(74) *Attorney, Agent, or Firm* — Barley Snyder

(57) ABSTRACT

A concrete structure forming system includes a panel formed of a concrete material and a void former disposed on a section of the panel that is less than an entirety of the panel. The void former is monolithically formed in a single piece of a plastic material. The void former is removable from the panel in the single piece to leave a recess in the panel when the concrete material has reached a cured state.

16 Claims, 8 Drawing Sheets

(56) References Cited

U.S. PATENT DOCUMENTS

2010/0011678 A1* 1/2010 Kelly ...................... E04G 15/04
52/707
2010/0084540 A1* 4/2010 Talley ................... E04G 15/061
249/1
2013/0313740 A1* 11/2013 Gilpin ..................... E04G 9/086
249/1
2015/0125221 A1* 5/2015 Kusuma .............. E02D 29/0233
405/262
2017/0089067 A1* 3/2017 Blackwell ........... B28B 23/0056
2021/0245394 A1* 8/2021 Rossart ................... E04B 1/383
2021/0268689 A1* 9/2021 Van Doren ............. E04G 11/40

* cited by examiner

CONCRETE STRUCTURE FORMING SYSTEM

FIELD OF THE INVENTION

The present invention relates to a structure forming system and, more particularly, to a concrete structure forming system including a concrete panel.

BACKGROUND

Concrete panels are used in the construction of buildings and other structures and, to create such structures, often require recesses or pockets in the panels to receive structural components. To create each separate recess in the panel, a form is assembled from wood and insulation material and the concrete of the panel is cured around the form.

When the concrete is cured, a worker must hammer and chip the form out of the cured concrete to leave the recess in the finished panel. The process of creating the form, assembling the wood and insulation materials together, is time consuming, as is the process of removing the form from the panel. Further, the form is destroyed during the removal and can only be used once to create one recess in the panel, requiring a significant and costly quantity of materials to create the necessary number of forms and corresponding recesses. The current formation of recesses in concrete panels is both inefficient and costly.

SUMMARY

A concrete structure forming system includes a panel formed of a concrete material and a void former disposed on a section of the panel that is less than an entirety of the panel. The void former is monolithically formed in a single piece of a plastic material. The void former is removable from the panel in the single piece to leave a recess in the panel when the concrete material has reached a cured state.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
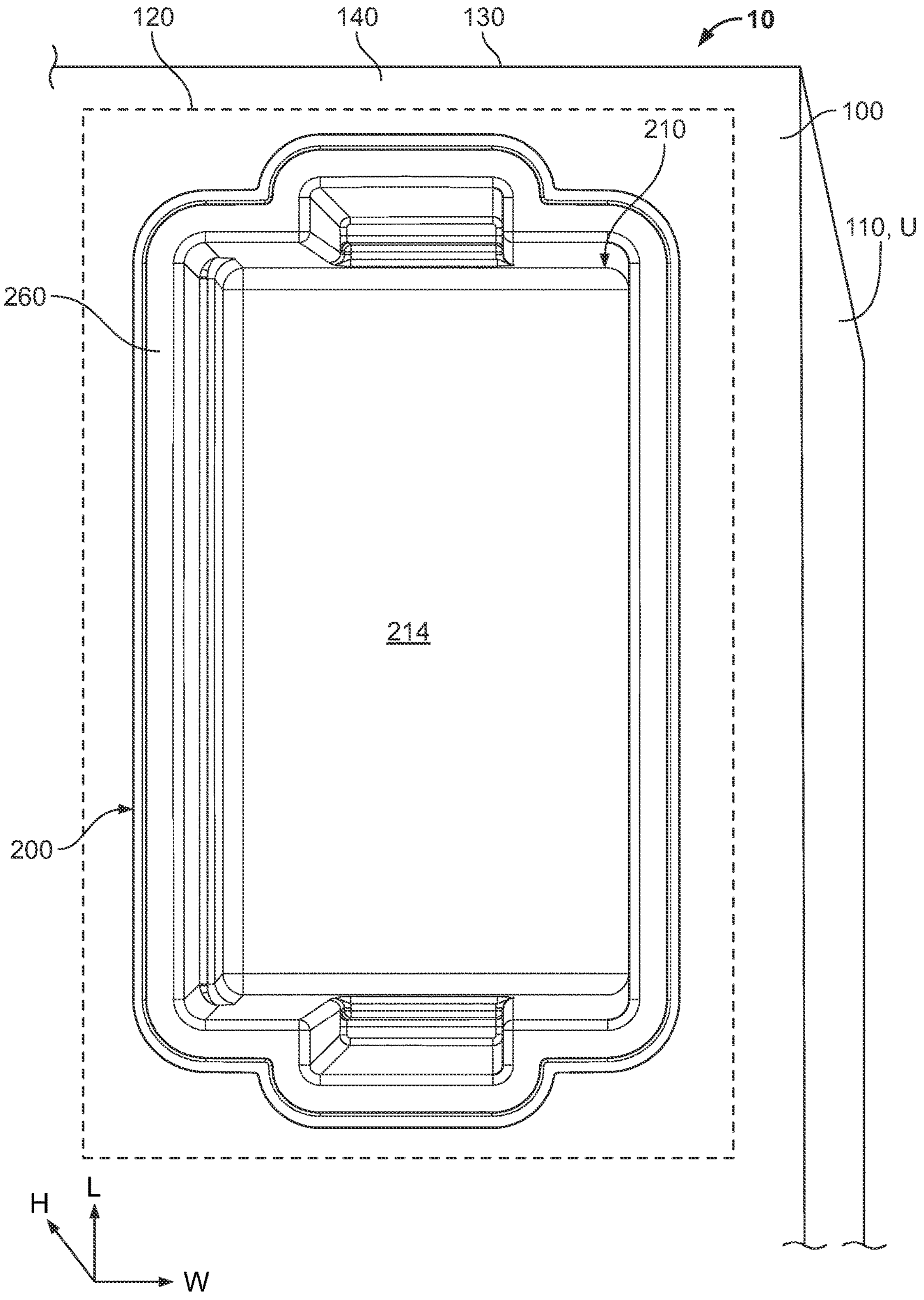
FIG. 1 is a top view of a concrete structure forming system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Throughout the specification, directional descriptors are used such as “width”, “height”, and “longitudinal”. These descriptors are merely for clarity of the description and for differentiation of the various directions. These directional descriptors do not imply or require any particular orientation of the disclosed elements.

Throughout the drawings, only one of a plurality of identical elements may be labeled in a figure for clarity of the drawings, but the detailed description of the element herein applies equally to each of the identically appearing elements in the figure.

A concrete structure forming system 10 according to an embodiment is shown in FIG. 1. The concrete structure forming system 10 comprises a panel 100 and a void former 200 disposed on a section 120 of the panel 100.

The panel 100 is formed of a concrete material 110. In the embodiment shown in FIGS. 1, 7, and 8, the panel 100 has a rectangular parallelepiped shape and can form a part of a building structure, such as a wall. The concrete material 110 is shown in an uncured state U in FIG. 1 and in a cured state C in FIGS. 7 and 8. The panel 100 can be cast-in-place or precast of the concrete material 110, or can be cast on site as a tilt-up panel 100.

Figure 2:
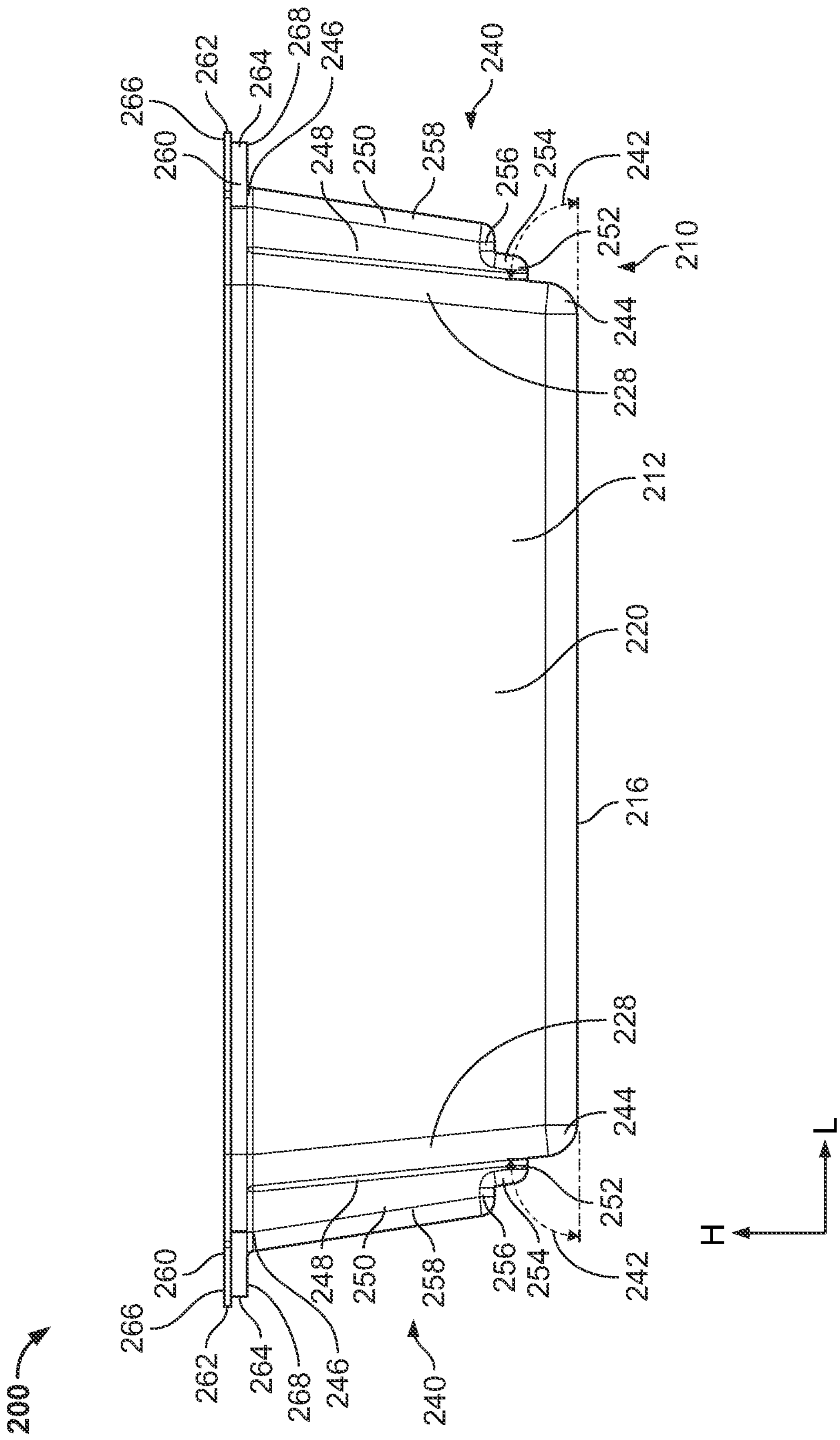
FIG. 2 is a side view of a void former of the concrete structure forming system of FIG. 1.
Figure 3:
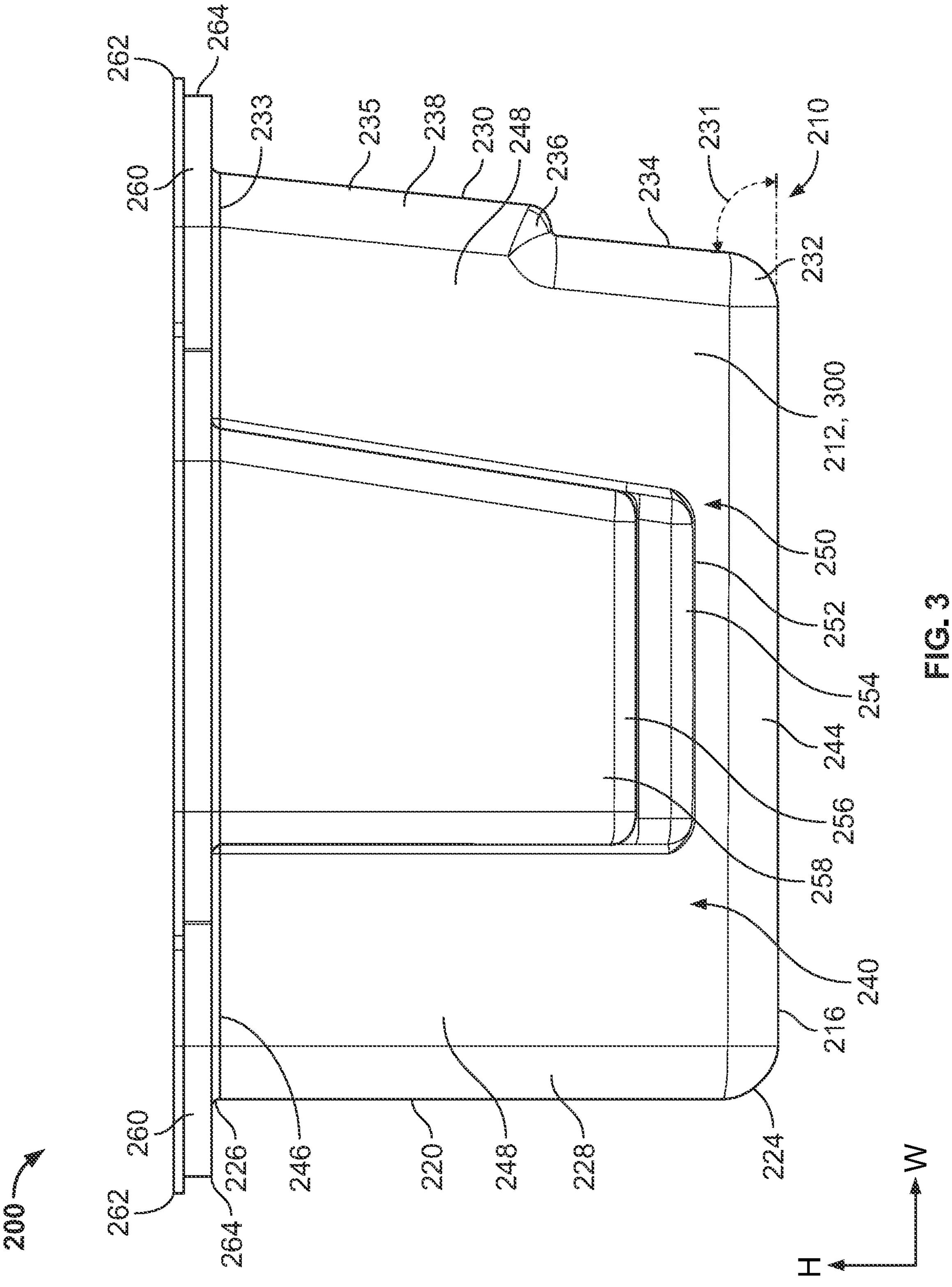
FIG. 3 is another side view of the void former of FIG. 2.

The void former 200, in the embodiment shown in FIGS. 1-3, has a body 210 and a flange 260 extending from the body 210.

The body 210, as shown in FIGS. 2 and 3, has a bottom wall 216, a first side wall 220 extending from the bottom wall 216, a second side wall 230 extending from the bottom wall 216 opposite to the first side wall 220 in the width direction W, and a pair of end walls 240 extending from the bottom wall 216. The pair of end walls 240 are positioned opposite one another in the longitudinal direction L and connect the first side wall 220 and the second side wall 230.

The bottom wall 216 is approximately flat, as shown in FIGS. 2 and 3. In an embodiment, the bottom wall 216 extends along a plane defined by the longitudinal direction L and the width direction W and is parallel to an outer surface 140 of the panel 100. The term “approximately” as used throughout the specification is intended to mean a quantity within 2% of the stated value; in the present example, the bottom wall 216 is flat or has an angle within 2% of flat.

The first side wall 220, as shown in FIG. 3, extends from a first bottom end 224 connected to the bottom wall 216 to a first top end 226 opposite the first bottom end 224 in a height direction H perpendicular to the longitudinal direction L and the width direction W. The first side wall 220 has an approximately trapezoidal outer shape with a pair of first longitudinal ends 228 opposite one another in the longitudinal direction L, as shown in FIG. 2. The first side wall 220 extends perpendicularly from the bottom wall 216 in the shown embodiment.

The second side wall 230 has a second bottom end 232 connected to the bottom wall 216 and a second top end 233 opposite the second bottom end 232 in the height direction H. The second side wall 230, as shown in FIG. 3, extends at an acute angle 231 with respect to the bottom wall 216. In the shown embodiment, the acute angle 231 is greater than 45° and less than 90°. The body 210 of the void former 200 is asymmetrical due to the acute angle 231 of the second side wall 230 with respect to the bottom wall 216 in comparison to the perpendicular orientation of the first side wall 220 with respect to the bottom wall 216. The second side wall 230 has an approximately trapezoidal outer shape corresponding to the outer shape of the first side wall 220, with a pair of second longitudinal ends 238 opposite one another in the longitudinal direction L.

As shown in FIG. 3, the second side wall 230 has a first side wall portion 234 extending at the acute angle 231 from the second bottom end 232 at the bottom wall 216, a second side wall portion 235 extending at the acute angle 231 to the second top end 233, and a side wall step 236 between the first side wall portion 234 and the second side wall portion 235. The side wall step 236 extends away from the first side wall 220 in the width direction W and, due to the side wall step 236, the second side wall portion 235 is positioned further from the first side wall 220 than the first side wall portion 234 in the width direction W.

The end walls 240, as shown in FIG. 2, each extend at an acute angle 242 with respect to the bottom wall 216. The acute angle 242 is greater than 45° and less than 90° and, in an embodiment, is equal to the acute angle 231. The end walls 240 each have an end wall bottom end 244 connected to the bottom wall 216 and an end wall top end 246 opposite the end wall bottom end 244 in the height direction H.

As shown in FIGS. 2 and 3, the end walls 240 each have an outer end wall section 248 extending between the end wall bottom end 244 and the end wall top end 246 and a central end wall section 250 positioned within the outer end wall section 248. The central end wall section 250 is positioned approximately centrally on the outer end wall section 248 in the width direction W and is spaced apart from the end wall bottom end 244 in the height direction H. The central end wall section 250 extends from the outer end wall section 248 in the longitudinal direction L and is positioned further from the first side wall 220 and the second side wall 230 than the outer end wall section 248.

The central end wall section 250, as shown in FIGS. 2 and 3, has a first end wall step 252 connecting a first end wall portion 254 to the outer end wall section 248 and a second end wall step 256 connecting a second end wall portion 258 to the first end wall portion 254. The first end wall portion 254 and the second end wall portion 258 extend at the acute angle 242. The first end wall step 252 extends away from the outer wall end section 248 in the longitudinal direction L and, due to the first end wall step 252, the first end wall portion 254 is spaced apart from the outer end wall section 248 in the longitudinal direction L. The second end wall step 256 extends away from the first end wall portion 254 and, due to the second end wall step 256, the second end wall portion 258 is spaced apart from the first end wall portion 254 in the longitudinal direction L. In other embodiments, the central end wall section 250 may have only one of the first end wall step 252 and the second end wall step 256, and only one end wall portion 254, 258, or may have three or more end wall steps and corresponding end wall portions positioned progressively further from the outer end wall section 248 in the longitudinal direction L.

The flange 260, in the embodiment of the void former 200 shown in FIGS. 1-3, extends from the first top end 226 of the first side wall 220, from the second top end 233 of the second side wall 230, and from the end wall top end 246 of the end walls 240. The flange 260 is parallel to the bottom wall 216 and perpendicular to the first side wall 220. In the shown embodiment, the flange 260 extends around an entire perimeter of the body 210 and extends a same distance from the body 210 along the entire perimeter. In the embodiment shown in FIGS. 2 and 3, the flange 260 has a lip 262 extending from an end 264 of the flange 260 opposite the body 210. The lip 262 has a thickness smaller than the flange 260 in the height direction H. The flange 260 has an inner surface 266 and an outer surface 268 opposite the inner surface 266 in the height direction H.

The body 210 has an outer surface 212 and an inner surface 214 opposite the outer surface 212, as shown in FIGS. 1-3. The inner surface 214 extends along the bottom wall 216, the first side wall 220, the second side wall 230, and the end walls 240. The outer surface 212 likewise extends along the bottom wall 216, the first side wall 220, the second side wall 230, and the end walls 240.

The void former 200 can be formed of any type of plastic material. In an embodiment, the void former 200 is formed of a thermoplastic material, such as polypropylene or high molecular weight polyethylene. The void former 200, including the body 210 and the flange 260, can be monolithically formed in a single piece of the plastic material, for example, by additive manufacturing, by thermoforming, or by injection molding.

Figure 4:
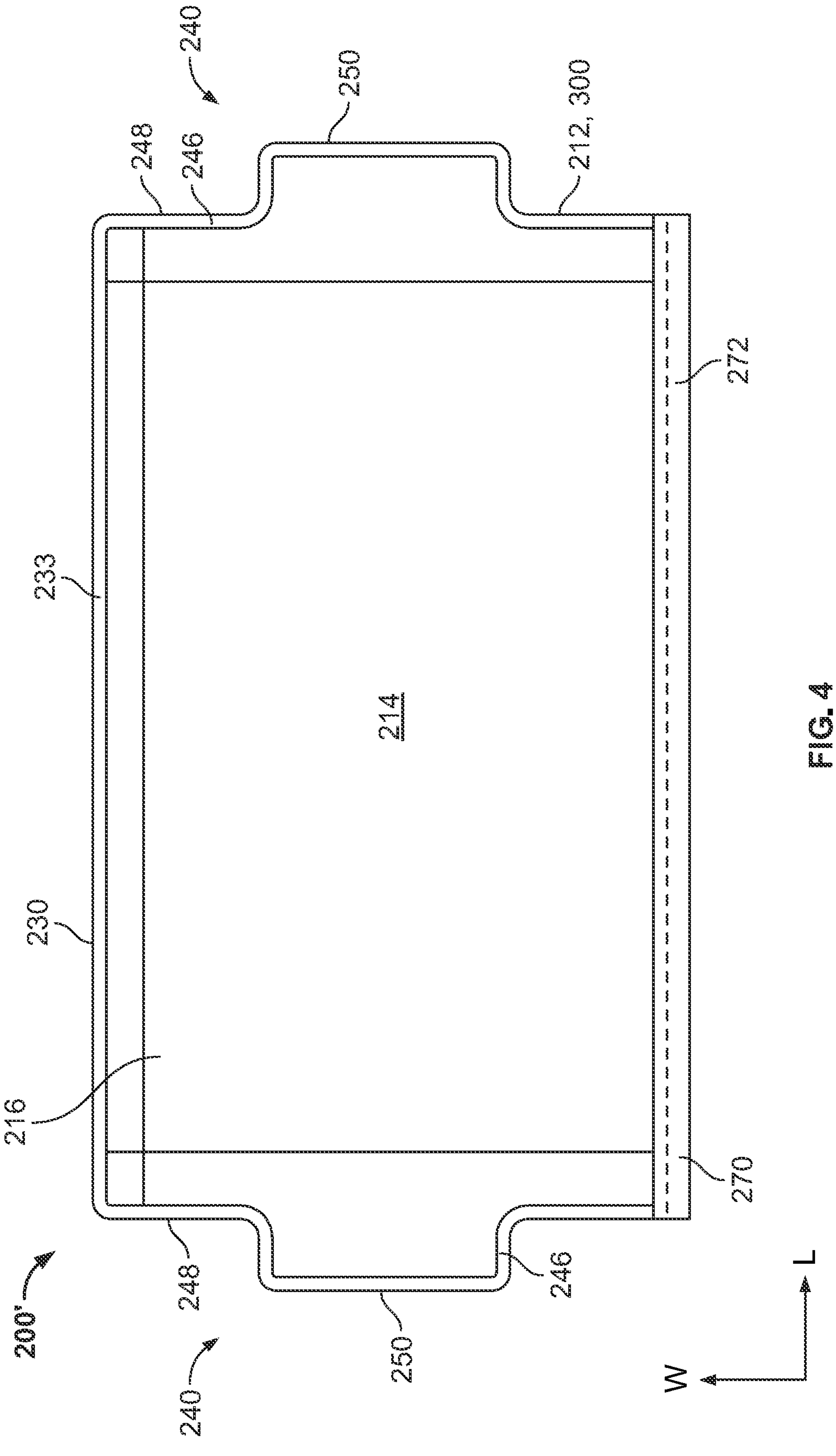
FIG. 4 is a top view of a void former according to another embodiment.
Figure 5:
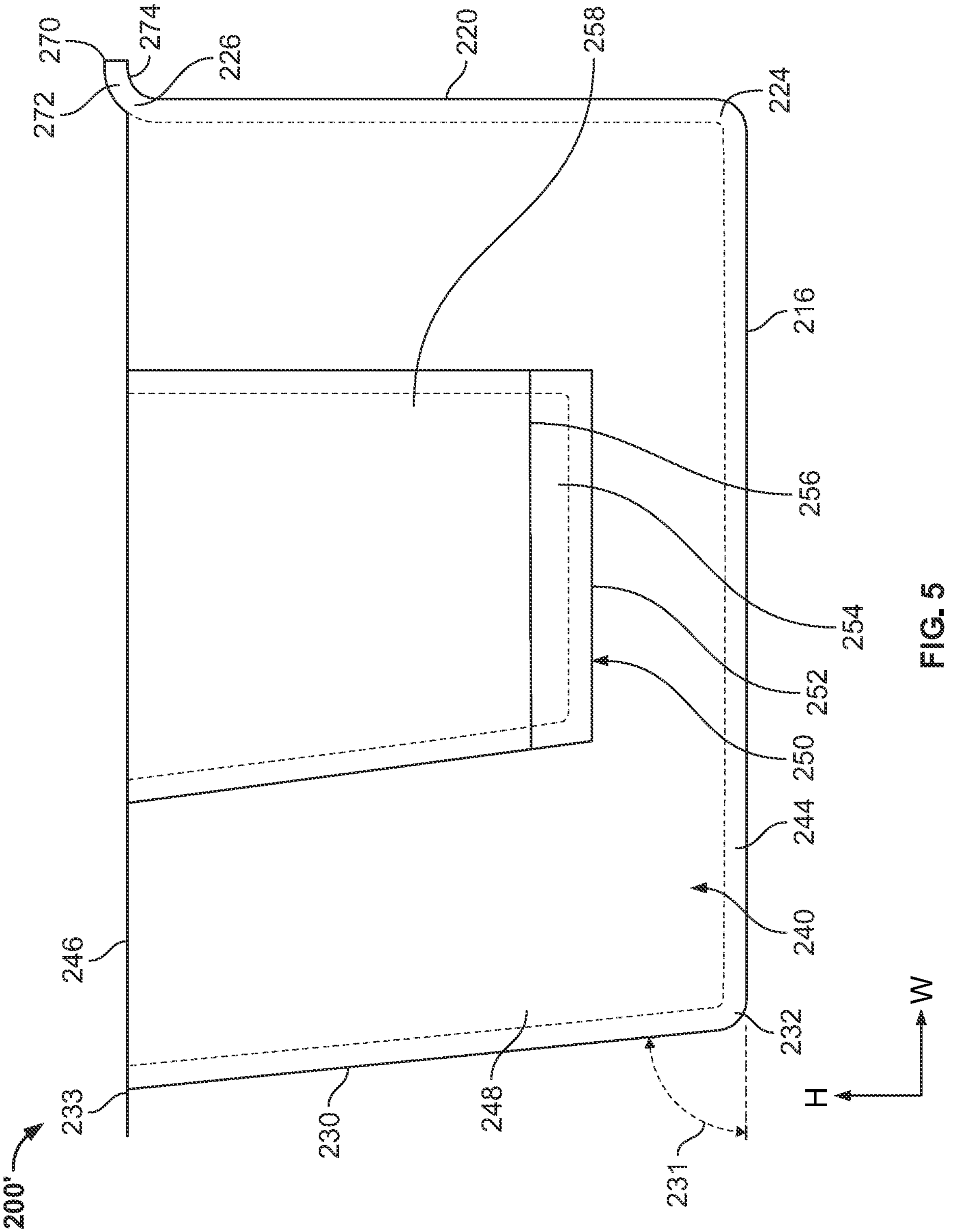
FIG. 5 is a side view of the void former of FIG. 4.

A void former 200' according to another embodiment is shown in FIGS. 4 and 5. Like reference numbers refer to like elements, and only the differences from the void former 200 shown in FIGS. 1-3 will be described in detail herein. The elements of the void former 200 and the void former 200' are not exclusive to the embodiments described herein but can be combined in any combination.

In the void former 200', the second side wall 230, as shown in FIG. 5, extends at the acute angle 231 from the second bottom end 232, but does not have the side wall step 236 and corresponding portion 234, 235 of the embodiment of FIG. 1-3. As shown in the embodiment of FIG. 5, the second side wall 230 can extend in a single plane at the acute angle 231.

As shown in FIGS. 4 and 5, the void former 200' has a rim 270 extending from the first top end 226 of the first side wall 220. The rim 270 has a curved shape with an inner surface 272 and an outer surface 274 opposite the inner surface 272 along the height direction H. In the shown embodiment, the rim 270 only extends from the first side wall 220. Unlike in the embodiment of FIGS. 1-3, in which the flange 260 extends from each of the walls 220, 230, 240 around an entire perimeter of the body 210, no element is disposed on or attached to the second top end 233 of the second side wall 230 and the end wall top ends 246 of the end walls 240 in the void former 200'. In other embodiments, the rim 270 can extend from only one of any of the walls 220, 230, 240, such as only from the second side wall 230.

The use of the void former 200, 200' with the panel 100 in the concrete structure forming assembly 10 will now be described in greater detail primarily with reference to FIGS. 1 and 6-8. A method 600 of forming a recess 150 in the panel 100 with the void former 200, 200' is shown in FIG. 6.

Figure 6:
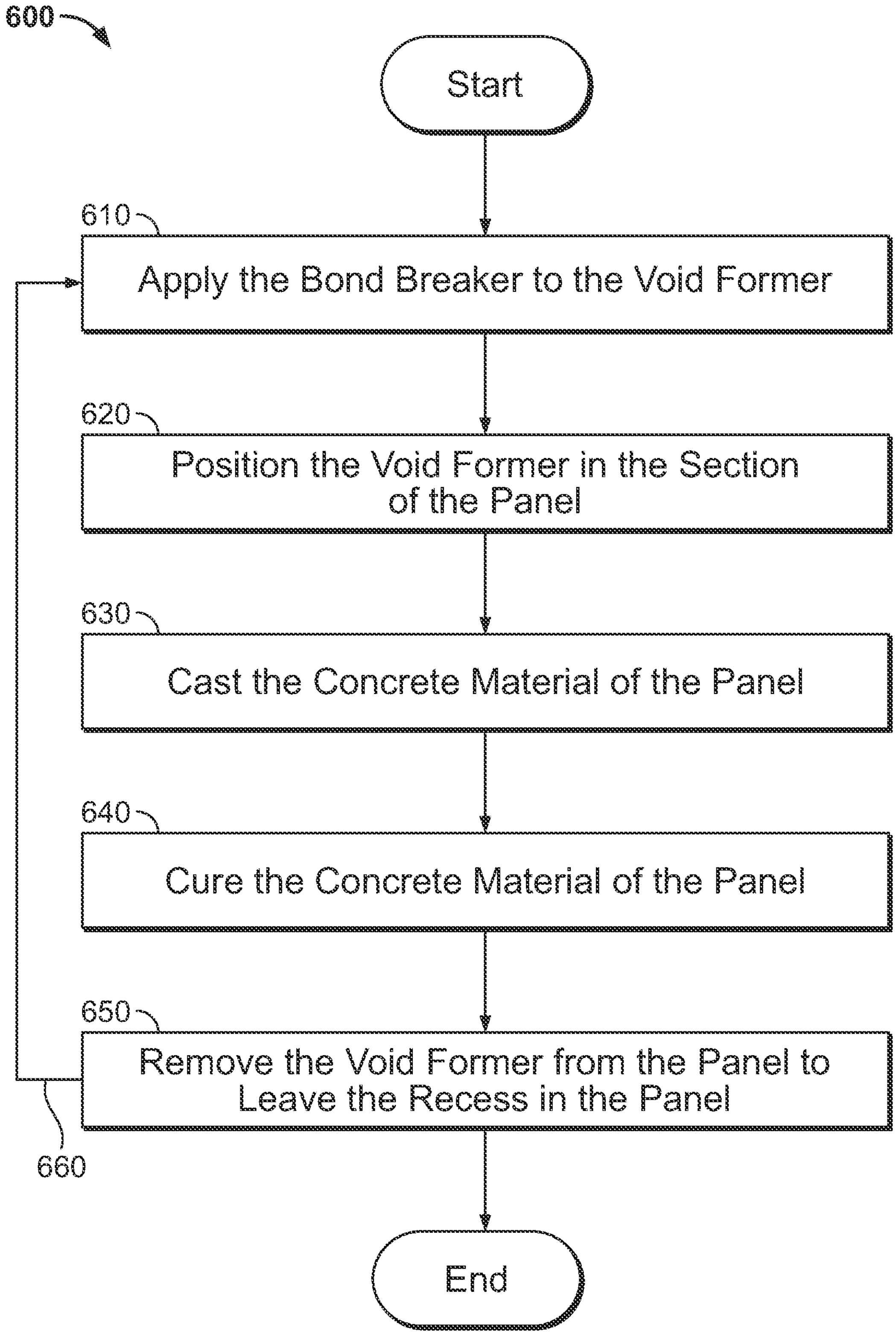
FIG. 6 is a flowchart of a process of forming a recess in a panel using the concrete structure forming system.

With the void former 200, 200' monolithically formed in the single piece from the plastic material as described above, a bond breaker 300 is applied to the outer surface 212 of the body 210 in a first step 610 shown in FIG. 6. In the void former 200, the bond breaker 300 may also be applied to the outer surface 268 of the flange 260 and, in the void former 200', the bond breaker 300 may also be applied to the outer surface 274 of the rim 270.

The bond breaker 300 may be any type of liquid material that can be applied to the plastic of the void former 200, 200' and prevents or limits adhesion of cured concrete to the void former 200, 200'. For example, the bond breaker 300 may be TILT-CRETE water-based bond breaker, or may be any other water-based or non-water based product that prevents or limits concrete adhesion to the void former 200, 200'. The bond breaker 300 may be sprayed onto the void former 200, 200', or may be wiped, rolled, or applied to the void former 200, 200' in any other manner.

Figure 7:
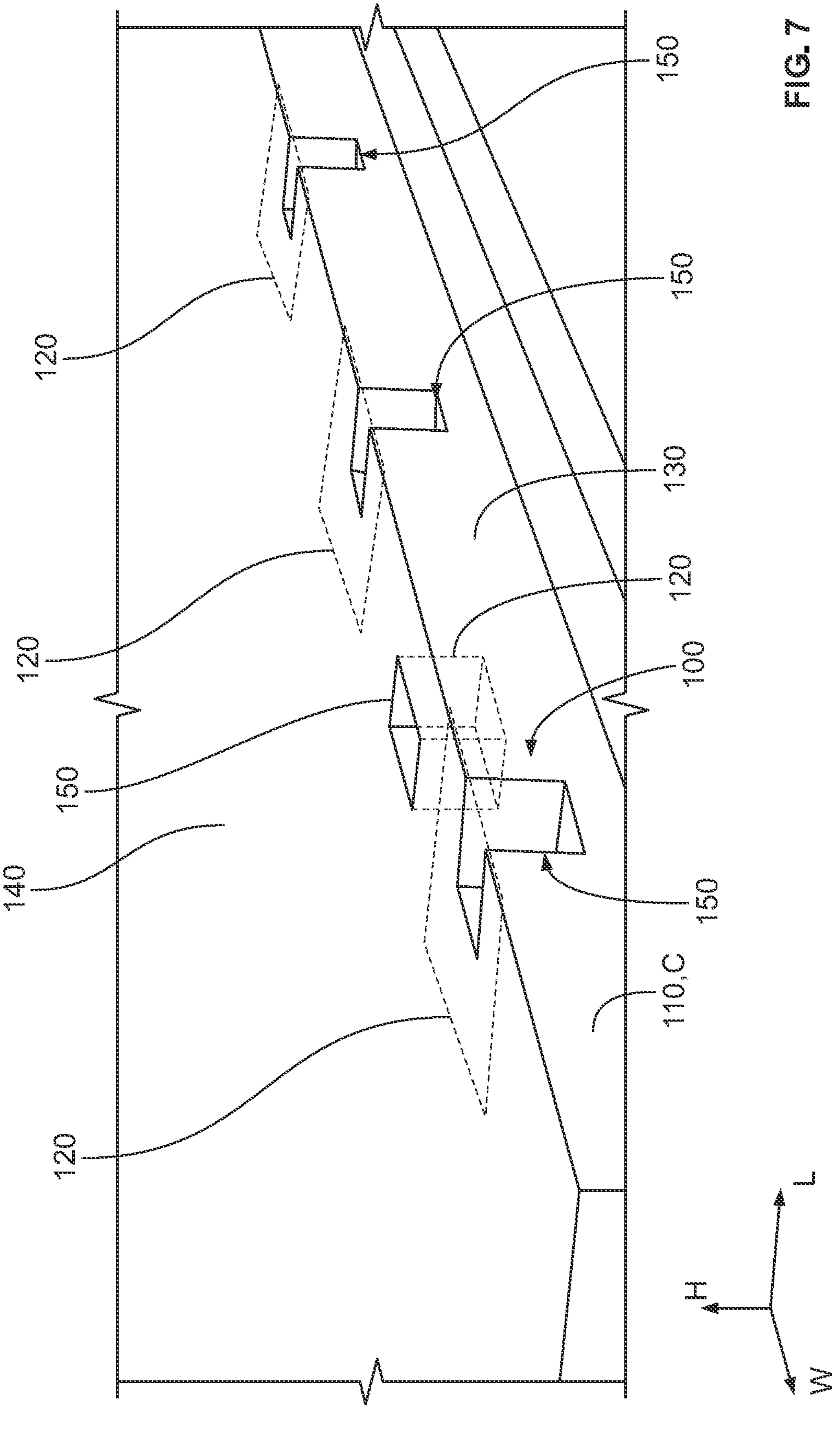
FIG. 7 is a perspective view of a panel with recesses created by the void former.
Figure 8:
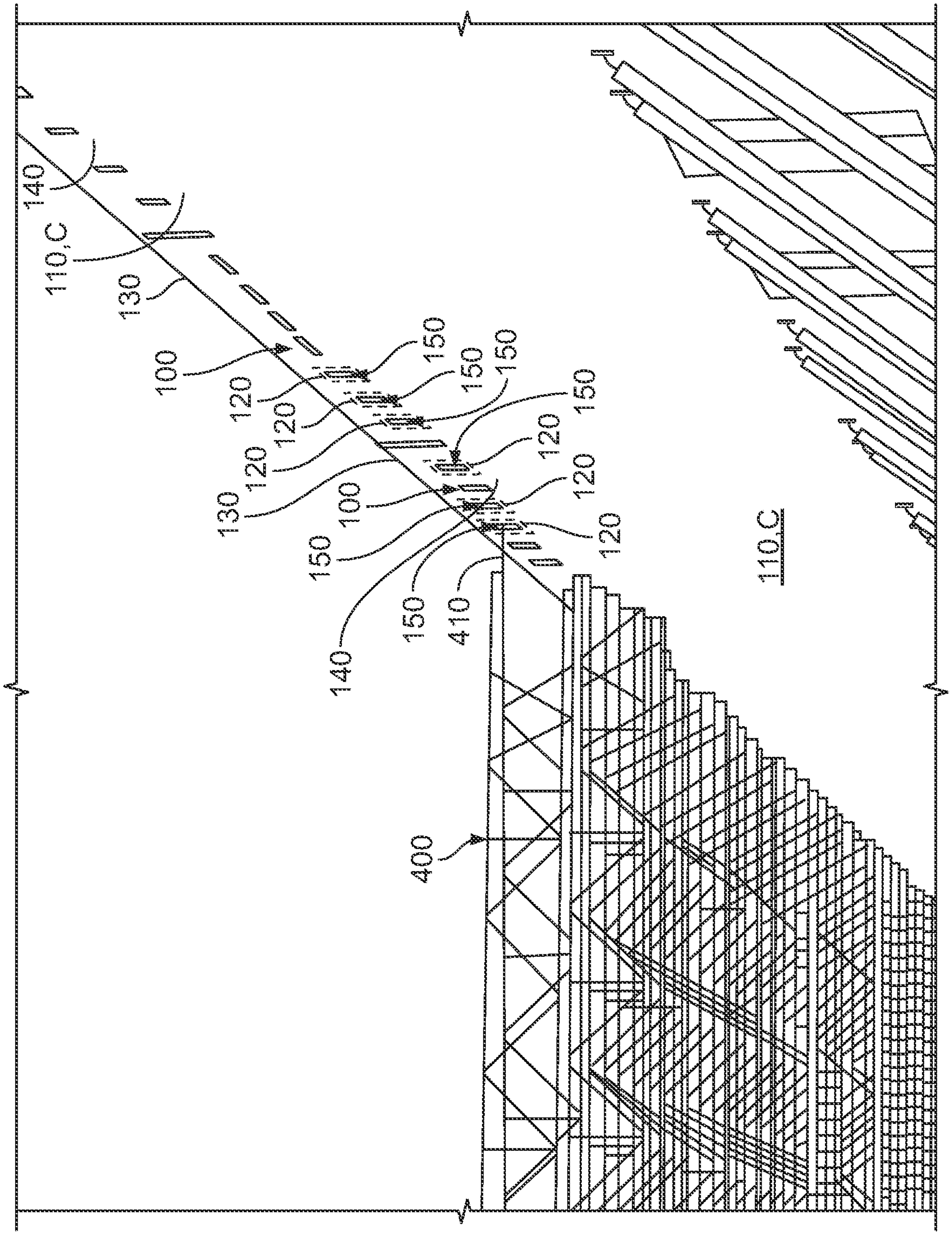
FIG. 8 is a perspective view of another panel with recesses created by the void former.

The void former 200', 200' with the bond breaker 300 applied, in a second step 620 shown in FIG. 6, is positioned on the section 120 of the panel 100. The section 120 of the panel 100 in which the void former 200, 200' is disposed is less than an entirety of the panel 100, as shown in FIGS. 1, 7, and 8. The section 120 can be disposed anywhere along the panel 100 in a longitudinal direction L and a width direction W perpendicular to the longitudinal direction L; the section 120, for example, can be disposed at an end 130 of the panel 100 in the longitudinal direction L, as shown in FIG. 7, or spaced apart from the end 130 of the panel 100 in the longitudinal direction L, as shown in FIGS. 1 and 8.

The void former 200, 200' is positioned on the section 120 in the second step 620 with the concrete material 110 of the panel 100 in the uncured state U. In an embodiment, the void former 200, 200' is first secured in a desired position and, in a third step 630 shown in FIG. 6, the concrete material 110 in the uncured state U is filled and cast around the void former 200, 200'. The void former 200, 200' can be secured in position and used to form the single recess 150 described below with the panel 100 formed from the concrete material 110 in a horizontal orientation, with the panel 100 in a vertical orientation, or at any other orientation of the panel 100. In an embodiment, rebar of the panel 100 can be positioned in a groove formed on the end walls 240 between the first end wall portion 254 and the second end wall step 256 to aid in positioning the void former 200, 200'. The body 210 of the void former 200, 200' is positioned within the concrete material 110 in the uncured state U and the flange 260 or the rim 270 is positioned on an outer surface 140 of the panel 100, as shown in FIG. 1. In a fourth step 640 shown in FIG. 6, the concrete material 110 of the panel 100 is cured from the uncured state U to the cured state C. The void former 200, 200' remains on the section 120 and within the concrete material 110 of the panel 100 while the concrete material 110 cures to the cured state C.

With the concrete material 110 in the cured state C, in a fifth step 650 shown in FIG. 6, the void former 200, 200' is removed from the panel 100 to leave a recess 150 in the panel 100. Exemplary recesses 150 in sections 120 of concrete panels 100 that are created by the void former 200, 200' are shown in FIGS. 7 and 8. A shape of the recess 150 corresponds to a shape of the body 210 of the void former 200, 200'.

The void former 200, 200' is removed in a single piece in the step 650. A user can use a tool or can manually engage the flange 260 of the void former 200 or the rim 270 of the void former 200' that is disposed on the outer surface 140 of the concrete panel 100 to aid in removal of the void former 200, 200', pulling the void former 200, 200' out from the cured concrete panel 100. The bond breaker 300 prevents adhesion of the concrete material 110 to the void former 200, 200' during the transition to the cured state C, allowing the void former 200, 200' to be removed and to leave the recess 150 in the panel 100 without damaging the void former 200, 200' or the panel 100. In an embodiment, the acute angles 231, 242 further aid in removability of the void former 200, 200' from the concrete material 110.

Because the void former 200, 200' is removable in a single piece from the panel 100 in the cured state C of the concrete material 110, the void former 200, 200' is reusable as shown in a loop 660 in FIG. 6. The same void former 200, 200' can then be used to create further recesses 150 in other different panels 100, saving on time and material cost for forming the recesses 150.

As shown in FIGS. 7 and 8, each void former 200, 200' leaves only a single recess 150 in the section 120 of the panel 100, allowing for flexible arrangements of recesses 150 that meet different application requirements. In an exemplary application shown in FIG. 8, the recess 150 can be disposed in a panel 100 used as a wall in a building structure, the recess 150 receiving an end 410 of a structural element 400, such as a bar joist, that is used to assemble and support the building structure.

What is claimed is:

1. A concrete structure forming system, comprising:

a panel formed of a concrete material; and a void former disposed on a section of the panel that is less than an entirety of the panel, the void former is monolithically formed in a single piece of a plastic material, the void former is removable from the panel in the single piece to leave a recess in the panel when the concrete material has reached a cured state, the void former has a body positioned within the concrete material in an uncured state of the concrete material, the body has a bottom wall, a first side wall extending from the bottom wall, a second side wall extending from the bottom wall opposite the first side wall, and a pair of end walls extending from the bottom wall and connecting the first side wall and the second side wall, the second side wall has a first side wall portion extending from the bottom wall, a second side wall portion extending from the first side wall portion to an end of the second side wall opposite the bottom wall in a height direction, and a side wall step between the first side wall portion and the second side wall portion, the side wall step positions the second side wall portion further from the first side wall than the first side wall portion, each of the end walls has an outer end wall section and a central end wall section positioned within the outer end wall section, the central end wall section is positioned further from the first side wall and the second side wall than the outer end wall section, the central end wall section has a first end wall step connecting a first end wall portion to the outer end wall section and a second end wall step connecting a second end wall portion to the first end wall portion, the second end wall portion is positioned further from the first side wall and the second side wall than the first end wall portion.

2. The concrete structure forming system of claim 1, wherein the void former has a flange or a rim extending from the body, the flange or the rim is positioned on an outer surface of the panel in the uncured state.

3. The concrete structure forming system of claim 2, wherein the flange has a lip extending from an end of the flange opposite the body, the lip has a smaller thickness than the flange.

4. The concrete structure forming system of claim 2, wherein the flange extends from the first side wall, the second side wall, and the end walls.

5. The concrete structure forming system of claim 2, wherein the rim extends from the first side wall.

6. The concrete structure forming system of claim 1, wherein the body of the void former is asymmetrical.

7. The concrete structure forming system of claim 1, wherein the first side wall extends perpendicularly from the bottom wall and the second side wall extends at an acute angle with respect to the bottom wall.

8. The concrete structure forming system of claim 7, wherein the end walls extend at the acute angle with respect to the bottom wall.

9. The concrete structure forming system of claim 1, further comprising a bond breaker disposed on an outer surface of the body, the bond breaker releases the void former from the concrete material in the cured state.

10. The concrete structure forming system of claim 1, wherein the void former is reusable to form the recess in a different panel formed of the concrete material.

11. The concrete structure forming system of claim 1, wherein the void former leaves only a single recess in the panel.

12. A method of forming a recess in a panel formed of a concrete material, comprising:

providing a void former monolithically formed in a single piece of a plastic material, the void former has a body with a bottom wall, a first side wall extending from the bottom wall, a second side wall extending from the bottom wall opposite the first side wall, and a pair of end walls extending from the bottom wall and connecting the first side wall and the second side wall, the second side wall has a first side wall portion extending from the bottom wall, a second side wall portion extending from the first side wall portion to an end of the second side wall opposite the bottom wall in a height direction, and a side wall step between the first side wall portion and the second side wall portion, the side wall step positions the second side wall portion further from the first side wall than the first side wall portion, each of the end walls has an outer end wall section and a central end wall section positioned within the outer end wall section, the central end wall section is positioned further from the first side wall and the second side wall than the outer end wall section, the central end wall section has a first end wall step connecting a first end wall portion to the outer end wall section and a second end wall step connecting a second end wall portion to the first end wall portion, the second end wall portion is positioned further from the first side wall and the second side wall than the first end wall portion;

positioning the void former in the concrete material in an uncured state of the panel, the void former is disposed on a section of the panel that is less than an entirety of the panel;

curing the concrete material to a cured state; and removing the void former from the panel in the single piece to leave the recess in the panel when the concrete material has reached the cured state.

13. The method of claim 12, further comprising repeating the positioning, curing, and removing steps with the same void former in a different panel formed of the concrete material.

14. The method of claim 12, further comprising applying a bond breaker on an outer surface of the void former before positioning the void former in the concrete material in the uncured state.

15. The method of claim 12, wherein the void former has a flange or a rim extending from the body, the flange or the rim is positioned on an outer surface of the panel and the void former is removed from the panel by engaging the flange or the rim.

16. A concrete structure forming system, comprising:

a panel formed of a concrete material; and a void former disposed on a section of the panel that is less than an entirety of the panel, the void former is monolithically formed in a single piece of a plastic material, the void former is removable from the panel in the single piece to leave a recess in the panel when the concrete material has reached a cured state, the void former has a body positioned within the concrete material in an uncured state of the concrete material, the body has a bottom wall, a first side wall extending from the bottom wall, a second side wall extending from the bottom wall opposite the first side wall, and a pair of end walls extending from the bottom wall and connecting the first side wall and the second side wall, the second side wall has a first side wall portion extending from the bottom wall, a second side wall portion extending from the first side wall portion to an end of the second side wall opposite the bottom wall in a height direction, and a side wall step between the first side wall portion and the second side wall portion, the side wall step positions the second side wall portion further from the first side wall than the first side wall portion, the void former has a rim extending from the body, the rim is positioned on an outer surface of the panel in the uncured state, the rim extends from only the first side wall.

* * * * *